United States Patent
Taylor

(10) Patent No.: US 10,022,726 B2
(45) Date of Patent: *Jul. 17, 2018

(54) WATER AND DIRT SEPARATOR

(71) Applicant: Adey Holdings (2008) Limited, Cheltenham (GB)

(72) Inventor: Matthew Taylor, Cheltenham (GB)

(73) Assignee: ADEY HOLDINGS (2008) LIMITED, Cheltenham, Gloucestershire (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/163,768

(22) Filed: May 25, 2016

(65) Prior Publication Data

US 2016/0264434 A1  Sep. 15, 2016

Related U.S. Application Data

(63) Continuation of application No. 13/990,856, filed as application No. PCT/GB2011/052374 on Dec. 1, 2011, now Pat. No. 9,463,471.

(30) Foreign Application Priority Data

Dec. 1, 2010 (GB) .................................. 1020350.3

(51) Int. Cl.
*B03C 1/30* (2006.01)
*B01D 21/00* (2006.01)
(Continued)

(52) U.S. Cl.
CPC ............ *B03C 1/30* (2013.01); *B01D 21/0009* (2013.01); *B01D 21/0036* (2013.01);
(Continued)

(58) Field of Classification Search
CPC ............ B01D 21/0009; B01D 21/0036; B01D 21/2483; B01D 2221/02; B03C 1/284;
(Continued)

(56) References Cited

U.S. PATENT DOCUMENTS

| | | |
|---|---|---|
| 3,339,740 A | 9/1967 | Starzyk |
| 4,544,483 A | 10/1985 | Arvai |

(Continued)

FOREIGN PATENT DOCUMENTS

| | | |
|---|---|---|
| DE | 19717869 A1 | 12/1997 |
| DE | 10310420 B3 | 7/2004 |

(Continued)

OTHER PUBLICATIONS

Search report issued by the UK Intellectual Property Office dated Mar. 25, 2011.

(Continued)

*Primary Examiner* — Dirk R Bass
(74) *Attorney, Agent, or Firm* — Michael E. Dockins; Shumaker, Loop & Kendrick, LLP

(57) ABSTRACT

A separator comprises a housing and a separator chamber contained within the housing, an inlet and outlet to the separator chamber and a dividing member for substantially dividing the separator chamber into a first chamber and a second chamber. A flow path is provided between the first and second chambers for allowing flow to circulate between the first and second chambers, and guide means for creating opposing flow paths in the second chamber for slowing flow through the second chamber.

20 Claims, 5 Drawing Sheets

(51) Int. Cl.
| | |
|---|---|
| *B01D 21/24* | (2006.01) |
| *B03C 1/28* | (2006.01) |
| *F24D 19/00* | (2006.01) |
| *B03C 1/02* | (2006.01) |
| *C02F 1/48* | (2006.01) |
| *C02F 103/02* | (2006.01) |

(52) U.S. Cl.
CPC ............ *B01D 21/2483* (2013.01); *B03C 1/02* (2013.01); *B03C 1/284* (2013.01); *B03C 1/286* (2013.01); *C02F 1/488* (2013.01); *F24D 19/0092* (2013.01); *B01D 2221/02* (2013.01); *B03C 2201/18* (2013.01); *B03C 2201/28* (2013.01); *C02F 2103/02* (2013.01); *C02F 2201/48* (2013.01); *C02F 2209/40* (2013.01); *C02F 2301/024* (2013.01); *C02F 2303/22* (2013.01); *C02F 2307/14* (2013.01)

(58) Field of Classification Search
CPC ....... B03C 1/286; B03C 1/30; B03C 2201/18; B03C 2201/28; F24D 19/0092
USPC ................................................ 210/223, 435
See application file for complete search history.

(56) References Cited

U.S. PATENT DOCUMENTS

| | | | |
|---|---|---|---|
| 4,585,553 | A | 4/1986 | Hikosaka et al. |
| 5,549,827 | A | 8/1996 | Batson |
| 2006/0283786 | A1 | 12/2006 | Adey |
| 2008/0083668 | A1 | 4/2008 | Caiozza |

FOREIGN PATENT DOCUMENTS

| | | |
|---|---|---|
| DE | 102004029197 A1 | 1/2006 |
| GB | 855928 A | 12/1960 |
| GB | 2402894 A | 12/2004 |

OTHER PUBLICATIONS

Examination Report issued by the UK Intellectual Property Office dated May 17, 2016.
International Search Report issued by the International Searching Authority dated Apr. 19, 2012.
Written Opinion of the International Searching Authority dated Apr. 19, 2012.
International Preliminary Report on Patentability dated Jan. 25, 2013.
KIPO Examination Report dated Aug. 9, 2016.
EPO Examination Report dated Jul. 29, 2016.

Figure 3B
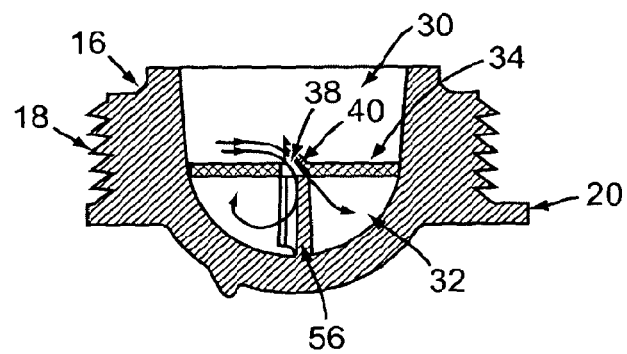
SECTION A-A
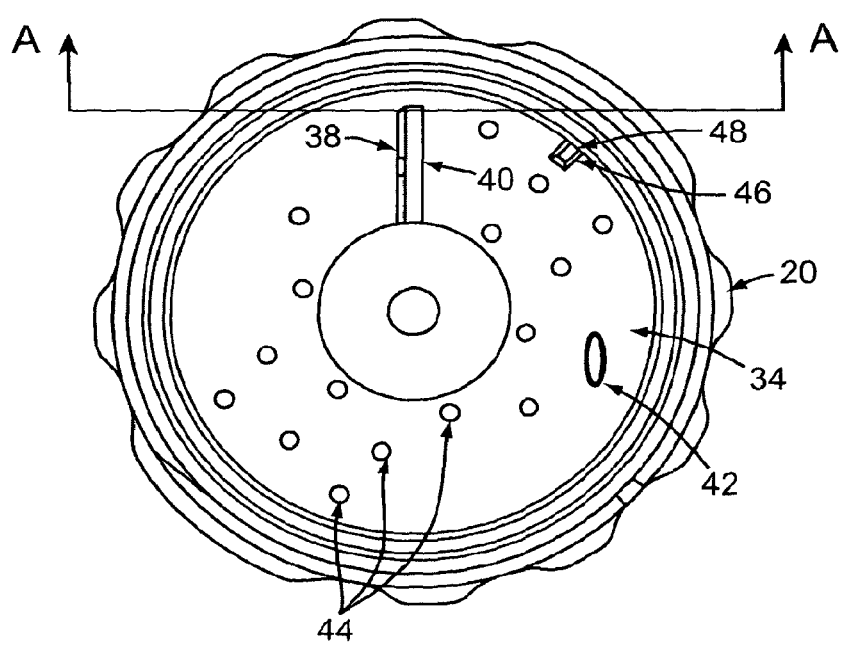
Figure 3A

WATER AND DIRT SEPARATOR

CROSS-REFERENCE TO RELATED APPLICATIONS

This application is a continuation of U.S. patent application Ser. No. 13/990,856, filed on Nov. 27, 2013, which in turn is a national stage of International Application Serial No. PCT/GB2011/052374, filed on Dec. 1, 2011, which in turn claims priority to British Patent Application No. GB1020350.3, filed on Dec. 1, 2010. The entire disclosures of the above applications are hereby incorporated herein by reference.

FIELD OF THE INVENTION

The present invention relates to a separator suitable for separating particles from a fluid flow and particularly but not exclusively to a separator for separating particles from central heating system water.

BACKGROUND OF THE INVENTION

It is already known to use a magnetic separator to separate magnetic particles from central heating system water, as described in granted British Patent GB2402894. It is a well understood problem that, over time, oxygen contained within the system water of domestic and commercial heating systems causes corrosion to the inner surfaces of pipes, radiators, boiler heat exchangers and the like. The corrosion results in the system water carrying ferrous particles, sometimes referred to as magnetite. Other non-magnetic particles are also carried in the system water. The magnetic and non-magnetic particles, if left in the system water, tend to build up as sludge over time and reduce the efficiency of the system. They may build up in the boiler thus reducing heat transfer, in the lower corners of radiators causing cold spots, or in pipe work causing reduced flowrate of system water and increasing the demand on the system pump.

It is known to add inhibitors to try and prevent corrosion, but often the inhibitors only slow or delay the onset of corrosion problems rather than removing them. Whilst a magnetic separator is effective in removing magnetite, it is only partially successful in removing non-magnetic particles. An advantage of, for example, the magnetic separator of GB 2402894 is that the flow of system water through the separator is hardly restricted at all and the losses in the separator are minimal. Swirl is set up in the separator around a sleeved magnet and magnetite in the system water is attracted out of the flow by magnetic attraction.

However, in order to effectively remove non-magnetic particles held in suspension, it is necessary to significantly slow the flow rate of the system water. However, it is undesirable to slow the flow rate, because this has a detrimental effect on the heating efficiency of the system. Furthermore, it is not desirable to pass the system water through a filter, such as a mesh or gauze, because this significantly impedes the flow, reduces efficiency, can clog easily and requires relatively frequent cleaning.

It is an object of the invention to provide a separator suitable for separating particles from water circulating in a closed system which substantially mitigates or reduces these problems.

STATEMENT OF INVENTION

According to the present invention, there is provided a separator comprising a housing and a separator chamber contained within the housing, an inlet and outlet to the separator chamber, a dividing member for substantially dividing the separator chamber into a first chamber and a second chamber, a flow path provided between the first and second chambers for allowing flow to circulate between the first and second chambers, and guide means for creating opposing flow paths in the second chamber for slowing flow through the second chamber.

Advantageously, the flow in the first chamber of the separator is substantially unrestricted, but a portion of the flow passes into the second chamber, where it is slowed by directing the flow against itself by the guide means. The slowing of the flow is sufficient to allow particles held in suspension in the system water to drop out of suspension and to collect in the bottom of the separator.

The housing may include an upper portion and a lower portion, the upper portion being detachable from the lower portion by means of a screw thread. The ability to remove the lower portion of the housing enables the collected sediment to be occasionally cleared.

A magnet may be provided in the first chamber for attracting magnetite out of the system water flow through the first chamber. A thin plastics tubular sleeve may be provided around the magnet, on which the magnetite may collect.

The tubular sleeve may be mounted to the dividing member and may extend longitudinally along a central axis of the separator, the dividing member and tubular sleeve being removable for cleaning, when the upper and lower portions of the housing are separated.

Co-operating locating means may be provided on the dividing member and housing respectively, for positioning the dividing member within the housing. In other words the angular position of the dividing member is fixed. This ensures most effective direction or guiding of flow between the first and second chambers.

An aperture may be provided through the dividing member and a guide means may be positioned adjacent the aperture for directing flow through the aperture from the first chamber to the second chamber. Ideally the aperture is a substantially radially extending slot. This enables flow across substantially the entire radius of the dividing member, and internal radius of the first chamber, to be directed into the second chamber in the lower part of the housing.

A guide wall may be provided in the lower portion for directing flow entering the lower portion through the aperture in the dividing member.

A space may be provided between the upper end of the guide wall and the underside of the dividing member. In use, flow may pass in one direction over the top of the wall and may be directed in the opposite direction by the wall. In other words, opposing flow paths are created in the second chamber.

At least a second aperture may be provided through the dividing member, the second aperture being approximately 120 degrees angularly displaced from the first aperture, behind the guide means, in the clockwise direction, when viewed from above. The inlet may be substantially tangential to the first chamber and flow in the first chamber is set up with a swirl in the clockwise direction.

The second aperture may be smaller than the first aperture and may serve in the manner of a venturi to draw flow back from the second chamber into the first chamber, once particles have dropped out of suspension.

Arrestor elements may be provided in the second chamber for further slowing flow. The arrestor elements may include a plurality of pins. At least one of the pins may extend through an aperture in the dividing member into the first chamber and the pins may extend parallel with a central longitudinal axis of the separator.

The arrestor elements may also include one or more walls or partitions. Each wall or partition may extend from one of the pins. In some cases, the walls may connect the pins.

A bleed valve may be provided for bleeding air from the separator, although if installed correctly, the separator should be self bleeding, since the outlet is positioned at the upper most point of the first, upper, chamber.

A dosing point may be provided for adding liquid to the separator, for example, rust inhibitor. The bleed valve and dosing point may be provided in a single fitting. The fitting may also be used to relieve pressure from within the separator, when it is isolated, to enable the first and second portions of the housing to be separated.

Elevated pressure within the housing has the effect of locking the thread, preventing separation.

DESCRIPTION OF THE DRAWINGS

For a better understanding of the present invention, and to show more clearly how it may be carried into effect, reference will now be made, by way of example only, to the accompanying drawings, in which:

FIG. 3A shows a plan view from above of the dividing member and lower housing;

FIG. 3B shows a cross-sectional view through FIG. 3A along line A-A;

DESCRIPTION OF PREFERRED EMBODIMENT

Figure 1:
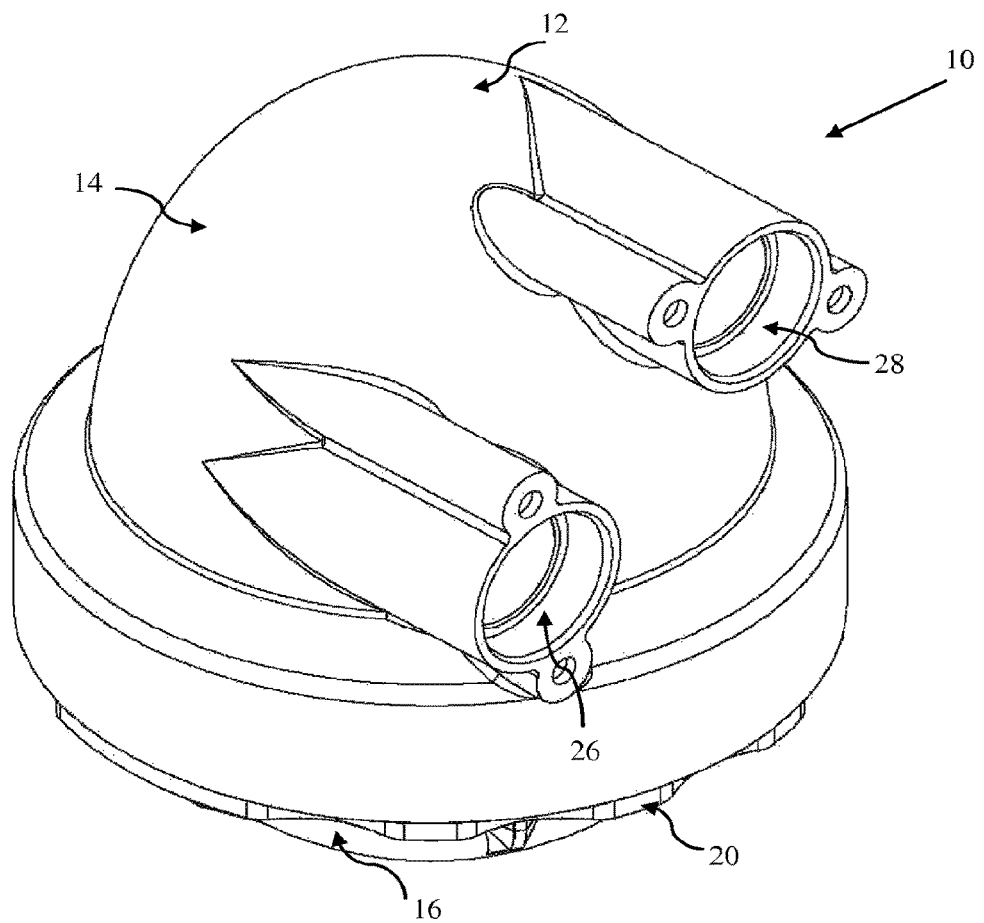
FIG. 1 shows a perspective view of a separator according to the present invention in an upright position for installation.
Figure 2:
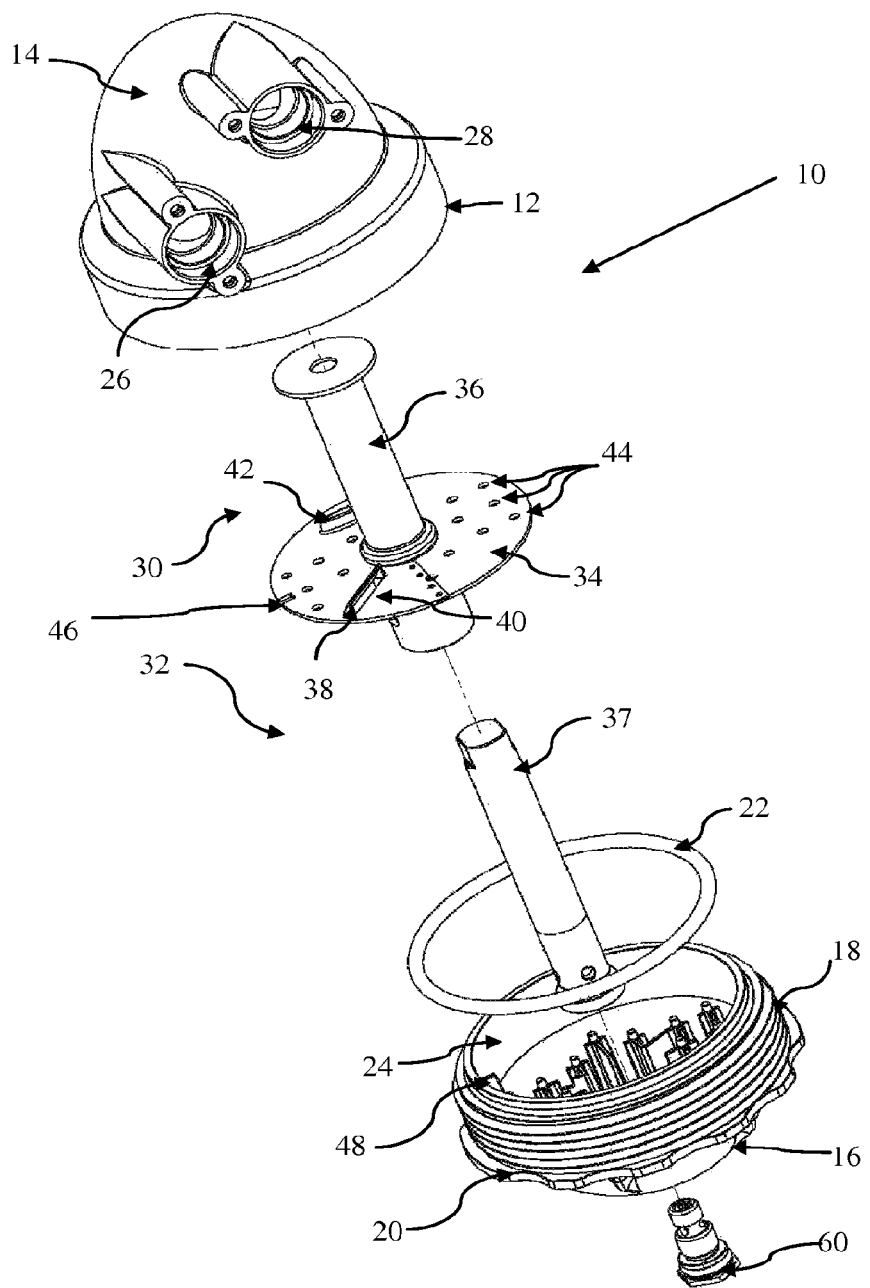
FIG. 2 shows a perspective exploded view of the separator of FIG. 1.

Referring firstly to FIGS. 1 and 2, a separator is indicated generally at 10. The separator 10 includes a housing 12 having an upper and a lower portion 14, 16. Each housing portion 14, 16 is substantially dome shaped and the lower portion is provided with an external screw thread 18, which engages with an internal screw thread provided in the lower part of the upper portion 14. A circumferential flange 20 is provided around the lower portion 16 and is scalloped to facilitate grip when tightening and un-tightening of the two portions 14, 16 when the screw threads are engaged. A circular seal 22, for example an O-ring, is pinched between facing surfaces of the upper and lower portions 14, 16 as the portions are tightened together.

The upper and lower portions 14, 16 together define an internal chamber, indicated generally at 24, where particles held in suspension in a liquid passing through the separator 10, are separated. An inlet 26 is provided in the wall of the upper portion 14 of the housing 12, which is substantially tangential to the side of the housing and is part-way down the housing in the dome shape. An outlet 28 is provided substantially extending from the top of the upper portion 14, but is also set marginally to one side of the dome shaped upper portion 14, such that liquid leaving the outlet 28 follows a substantially tangential path. The tangential arrangements of the inlet 26 and outlet 28 serve to set up a swirling flow within the internal chamber 24. Furthermore, the positioning of the outlet 28 at the top of the separator 10 means that the separator is self bleeding.

The internal chamber 24 is substantially divided into an upper chamber 30, indicated generally on FIGS. 2 and 3B a lower chamber 32. A dividing member 34 substantially in the form of a circular flat plate divides the internal chamber 24 and is mounted on a tubular sleeve member 36 which extends internally of the separator 10 from top to bottom. In practice, the dividing member 34 may be provided in one or two parts which may be connected together around the tubular sleeve 36. Various apertures are provided through the dividing member 34 as will be described in detail below, and flow is able to circulate between the upper and lower chambers 30, 32. A magnet or stack of magnets is provided in a hermetically sealed cylindrical magnet pack 37 and is arranged to extend through the tubular sleeve member 36. Magnetic particles are attracted out of the flow in the upper part of the separator and collect on the tubular sleeve member 36, which can easily be wiped clean when the magnet pack 37 is removed.

Referring in particular to FIGS. 3A and 3B, a radial slot 38 is provided through the dividing member 34 and an angled guiding surface 40 is provided adjacent the radial slot 38 for guiding flow impacting the guiding surface 40 through the radial slot 38 from the upper chamber 30 to the lower chamber 32. A further aperture is located through the dividing member 34 approximately 110 degrees beyond the radial slot 38 in the clockwise direction, when viewed as in FIG. 2, and a shroud 42 is provided over the aperture with a closed end of the shroud facing in the direction of the radial slot 38, i.e. in an anticlockwise direction. A plurality of other circular apertures 44 are provided through the dividing member 34, thirteen of which are shown in FIG. 2. A notch or cutaway 46 is provided in the periphery of the dividing member 34 for engagement with an inwardly facing protrusion 48 disposed on the internal wall of the lower portion 16. In use, the notch 46 locates on the protrusion 48 and determines the in-use position of the dividing member 34.

Figure 5:
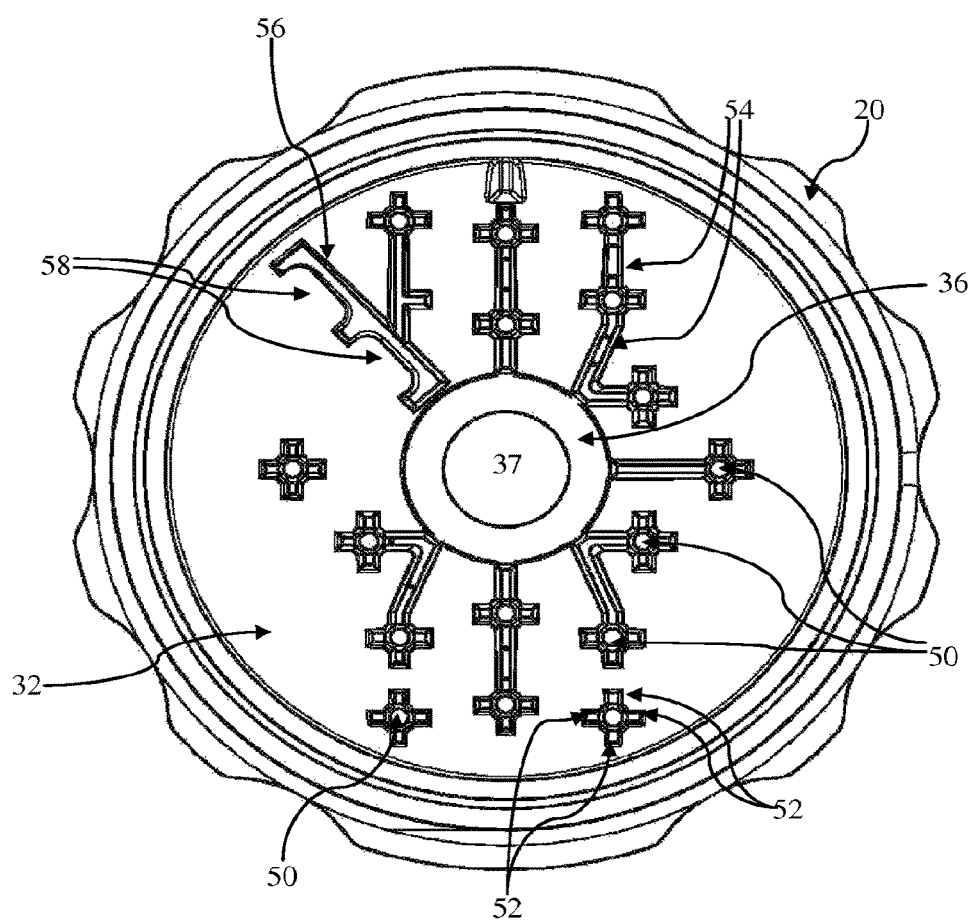
FIG. 5 shows a plan view from above of the inside of the lower portion of the housing of the separator of FIG. 1.

Referring also to FIG. 5, a plurality of arrestor elements in the form of pins or posts 50 are mounted to the base of the lower chamber 32 and extend upwardly, substantially parallel to a vertical central axis of the separator 10. Each pin 50 is provided with a plurality of axially extending side members or fins 52, which when viewed from above, form a crucifix. Some of the pins 50 are connected by walls 54, and some of the walls extend towards and up to the tubular sleeve member 36. The walls 54 provide further obstruction mean to flow in the second or lower chamber 32.

A radially extending guide wall 56 is positioned in the lower chamber 32, substantially directly underneath the radial slot 38. The guide wall 56 is shaped on its surface to provide two parallel channels 58. The top of the wall 56 does not contact the underside of dividing member 34, but rather there is a gap for allowing the passage of flow, as described further below.

Figure 4:
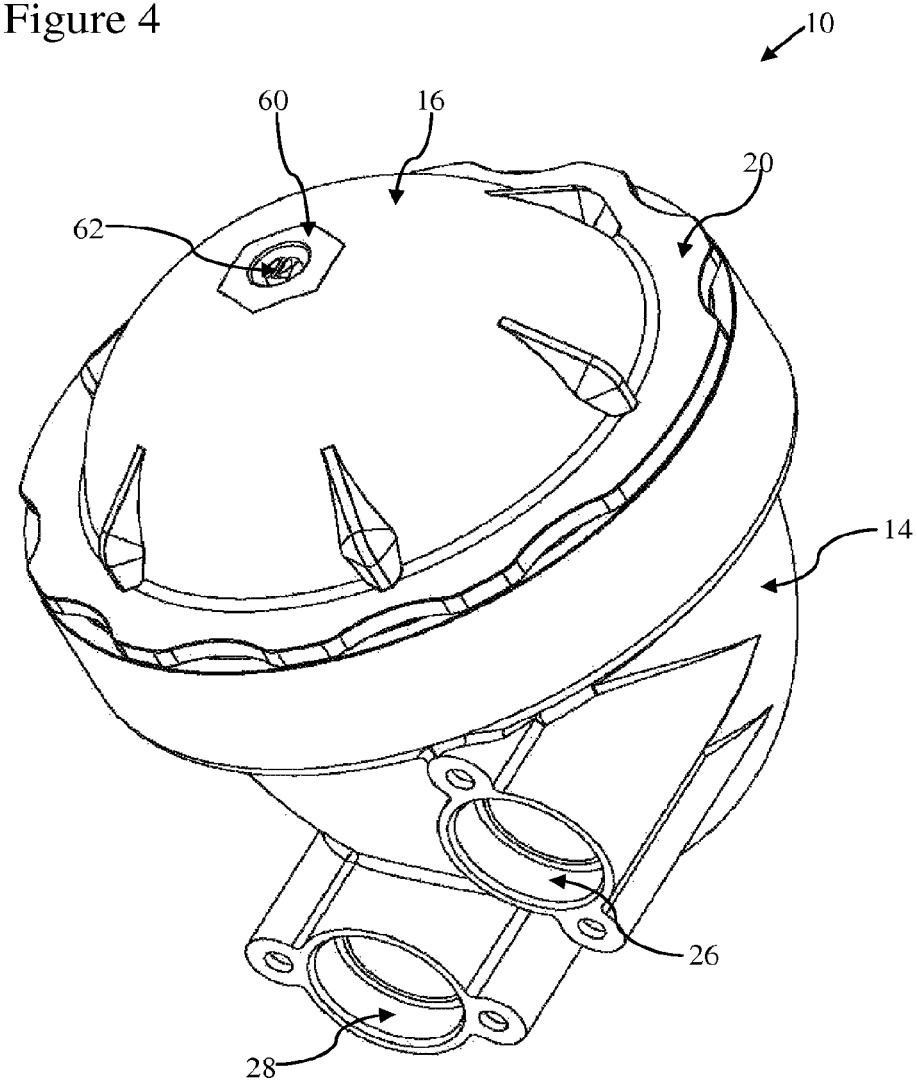
FIG. 4 shows a perspective underside view of the separator of FIG. 1.

Referring now to FIG. 4, a fitting 60 is provided centrally at the bottom of the lower housing 16. The fitting 60 is similar to that described in the applicant's granted patent GB 2402894, which is incorporated herein by reference. The fitting 60 serves both as a bleed point and a dosing point.

The fitting 60 has an axial bore extending there-through which is sealed at its outer end by a screw-in plug 62. A valve seating is provided part way along the axial bore which seats a substantially spherical valve member. The valve member is biased into contact with the valve seating by means of a spring.

When it is desired to dose the separator with, for example, an inhibitor, then the screw-in plug 62 can be removed and the spherical valve member is biased into contact with the valve seating thereby sealing the axial bore and preventing fluid from leaving the separator 10. A fluid dosing dispenser can then be attached to the threaded axial bore and pressurized, thereby forcing fluid through the axial bore into the separator 10 by lifting the spherical valve member off the valve seating. Once sufficient fluid has been pumped into the separator 10, then the spherical valve member returns to its rest position against the valve seating and seals the axial bore.

The fitting 60 is generally not used as a bleed valve in this application, because the valve is positioned at the bottom of the separator 10 and the separator is self bleeding. However, the bleed valve aspect can be used to release fluid pressure from within the separator for unscrewing the two parts of the housing 14, 16. To release the pressure, the screw-in plug 62 can be screwed into the fitting 60 such that a projection on the end of the plug contacts the spherical valve member and lifts it from the valve seating against the bias of the spring. The internal pressure forces any air or liquid contained in the base of the separator to flow freely through the axial bore and past the plug 62 to atmosphere.

The operation of the separator 10 will now be described. The separator is suitable for use with all central heating systems and can be fitted anywhere in the main circuit. However in order to achieve the best protection for the boiler it is recommended that the separator be fitted after the last radiator in the circuit before the boiler. The return flow pipe to the boiler should be connected to the inlet 26 and the outlet 28 is then connected back to the return pipe for connection to the boiler. The inlet and outlet 26, 28 are unrestricted, and therefore there should be minimal restriction to the flow by installation of the separator. The inlet 26 is provided substantially tangentially to the wall of the upper chamber 30 directly above the dividing member 34. The outlet 28 is also tangentially disposed at the top of the first chamber 30.

Once installed, the housing portions 14, 16 are screwed together with the seal 22 between them. The hermetically sealed magnet pack 37 is disposed within the sleeve 36. Conveniently it can be moved in and out of the tubular sleeve by sliding. Any air in the separator 10 passes through the outlet 28, which as previously described, is at the top of the separator, when installed.

As the system water flows through the inlet 26, swirl is set up in the first chamber 30 around the magnet pack 37 and any magnetite is attracted to the external wall of the sleeve 36, where it collects. As the flow passes over the top of the dividing member 34, the flow is marginally slowed by virtue of the tips of the pins 50. A portion of the flow is directed down through the radial slot 38 by the guiding surface 40 into the second chamber 32. Some of the flow passes over the top of the wall 56 and the rest of the flow impinges on the wall 56 and is forced to change direction, as indicated in FIG. 3B. The flow in the second chamber 32 is slowed further by the pins 50, wings 52 and walls 54, to such an extent that particles fall out of suspension and collect in the bottom of the separator. Build up of particles tends to occur close to the arrestor elements and walls, where the flow is slowest.

Flow is able to pass out of the second chamber 32 back into the first chamber through the apertures 44 and also through the aperture under the shroud 42. This aperture is relatively restricted and acts as a venturi, speeding up flow passing through the aperture and drawing it through.

For cleaning, the inlet and outlet 26, 28 of the separator 10 can be isolated, the pressure inside the housing released by the bleed valve fitting 60, and the lower portion 16 of the housing removed for cleaning. The sealed magnet pack 37 can be removed from the tubular sleeve 36 and the sleeve also cleaned.

The separator can be re-commissioned after cleaning, by re-assembly, connection to the system. The separator is highly effective at removing magnetic and non-magnetic contaminant particles held in suspension, and helps maintain optimum heating system performance.

What is claimed is:

1. A magnetic separator for separating particles from central heating system water, the separator comprising a housing, a separator chamber contained within the housing, an inlet and outlet to the separator chamber, a dividing member substantially dividing the separator chamber into a first chamber and a second chamber, a magnet provided in the first chamber, a flow path provided between the first and second chambers for allowing flow to circulate between the first and second chambers, and a flow guide disposed in the flow path between the first chamber and the second chamber for creating opposing flow paths in the second chamber from flow entering the second chamber via the flow guide, the opposing flow paths including a first flow portion flowing in a first direction and a second flow portion flowing in a second direction opposite the first direction, the opposing flow paths meeting in an area of the second chamber where the flow in each flow path is substantially towards opposing flow in the other flow path for slowing flow through the second chamber.

2. The separator of claim 1, in which a tubular sleeve is provided around the magnet.

3. The separator of claim 2, in which the tubular sleeve is mounted to the dividing member and extends longitudinally along a central axis of the first chamber.

4. The separator of claim 3, in which the dividing member and tubular sleeve are removable for cleaning.

5. The separator of claim 1, in which co-operating locating formations are provided on the dividing member and housing respectively, for positioning the dividing member within the housing.

6. The separator of claim 1, in which an aperture is provided through the dividing member and a flow guide is positioned adjacent the aperture for directing flow through the aperture from the first chamber to the second chamber.

7. The separator of claim 6, in which the aperture is a substantially radial slot.

8. The separator of claim 6, in which a guide wall is provided in the second chamber for directing flow entering the lower portion through the aperture in the dividing member.

9. The separator of claim 8, in which a space is provided between the upper end of the guide wall and the underside of the dividing member, in use, flow passing in one direction over the top of the wall and being directed in the opposite direction by the wall.

10. The separator of claim 6, in which at least a second aperture is provided through the dividing member, the second aperture being around 120 degrees angularly displaced from the first aperture, behind the flow guide.

11. The separator of claim 10, in which the second aperture is smaller than the first aperture.

12. The separator of claim 1, in which arrestor elements are provided in the second chamber for slowing flow.

13. The separator of claim 12, in which the arrestor elements include a plurality of pins.

14. The separator of claim 13, in which the pins extend parallel with a central longitudinal axis of the separator.

15. The separator of claim 12, in which the arrestor elements include one or more walls.

16. The separator of claim 15, in which the arrestor elements further include a plurality of pins and in which the one or more walls extend from one of the pins.

17. The separator of claim 1, in which a bleed valve for releasing pressure from the separator and a dosing point for adding liquid to the separator are provided in a single fitting.

18. The separator of claim 1, in which flow in the first chamber is substantially unrestricted.

19. A magnetic separator for separating particles from central heating system water, the separator comprising a housing, a separator chamber contained within the housing, an inlet and outlet to the separator chamber, a dividing member substantially dividing the separator chamber into a first chamber and a second chamber, a flow path provided between the first and second chambers for allowing flow to circulate between the first and second chambers, and a flow guide disposed in the flow path between the first chamber and the second chamber for creating opposing flow paths in the second chamber from flow entering the second chamber via the flow guide, the flow guide including a reversing portion adapted to change the direction of a portion of the flow entering the second chamber and impinging on the flow guide for providing a first flow portion flowing in a first direction within the second chamber, and a bypass portion allowing passage past the flow guide of a further portion of the flow entering the second chamber, without change of direction of the further portion for providing a second flow portion flowing in a second direction opposite the first direction within the second chamber, the second chamber configured wherein the first flow portion and the second flow portion flow away from the flow guide and then against each other for slowing the flow through the second chamber.

20. A separator comprising a housing, a separator chamber contained within the housing, a dividing member substantially dividing the separator chamber into a first chamber and a second chamber, an inlet and outlet to the first chamber, a flow path provided between the first and second chambers for allowing flow to circulate from the first chamber to the second chamber and from the second chamber to the first chamber, and a flow guide for creating opposing flow paths in the second chamber by directing a portion of the flow into the second chamber and directing the flow in the second chamber against itself, the opposing flow paths meeting in an area of the second chamber where the flow in each path is substantially towards opposing flow in the other path for slowing flow through the second chamber, wherein flow in the first chamber between the inlet and the outlet thereof is substantially unrestricted.

* * * * *